United States Patent
Funahashi (10) Patent No.: US 7,254,629 B1
(45) Date of Patent: Aug. 7, 2007

(54) NETWORK SYSTEM, TERMINAL AND RECORDING MEDIUM

(75) Inventor: Hiroyuki Funahashi, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/231,114

(22) Filed: Jan. 14, 1999

(30) Foreign Application Priority Data

Jan. 19, 1998 (JP) .................................. 10-008113

(51) Int. Cl.
G06F 15/173 (2006.01)
G06F 15/16 (2006.01)

(52) U.S. Cl. ...................................... 709/224; 709/206

(58) Field of Classification Search ................ 709/203, 709/208, 218, 223, 228, 206, 205, 224; 710/62
See application file for complete search history.

(56) References Cited

U.S. PATENT DOCUMENTS

| | | | |
|---|---|---|---|
| 5,276,440 A | 1/1994 | Jolissaint et al. | |
| 5,651,006 A | 7/1997 | Fujino et al. | |
| 5,901,286 A * | 5/1999 | Danknick | 709/203 |
| 6,021,429 A * | 2/2000 | Danknick | 709/208 |
| 6,170,007 B1 * | 1/2001 | Venkatraman et al. | 709/218 |
| 6,209,048 B1 * | 3/2001 | Wolff | 710/62 |
| 6,269,481 B1 * | 7/2001 | Perlman et al. | 717/11 |
| 6,289,371 B1 * | 9/2001 | Kumpf et al. | 709/203 |

FOREIGN PATENT DOCUMENTS

| | | |
|---|---|---|
| JP | 5-153121 | 6/1993 |
| JP | A 5-282111 | 10/1993 |
| JP | A 7-334445 | 12/1995 |
| JP | A 8-278863 | 10/1996 |
| JP | A 9-162863 | 6/1997 |
| JP | A 11-203087 | 7/1999 |
| WO | WO-97/43720 | 11/1997 |

OTHER PUBLICATIONS

Co-pending U.S. Appl. No.: 09/129,537; filed: Aug. 5, 1998; Inventor: Kiyotaka Ohara; Title: Method for Managing a Status Request Transmitted from a Managing Device to an Interface Device Through a Network.

* cited by examiner

*Primary Examiner*—Paul H. Kang
(74) *Attorney, Agent, or Firm*—Oliff & Berridge PLC (57) ABSTRACT

A network system includes printers as terminals interconnected via a network. Each of the printers can obtain information on the others, and transmit the obtained information together with information on itself to a browser computer as a controller. Therefore, by obtaining the information only from one of the printers, the computer can obtain together with it the information on the others. In this system, it is possible to obtain the information on the printers efficiently without using a server computer.

32 Claims, 8 Drawing Sheets

NETWORK SYSTEM, TERMINAL AND RECORDING MEDIUM

BACKGROUND OF THE INVENTION

1. Field of the Invention

The present invention relates to a network system including a number of terminals connected to a network, and a controller controlling the terminals via the network. The invention also relates to a terminal and a recording medium which can form a part of such a network system.

2. Description of Related Art

A known network system of this type includes a number of printers as terminals and a single computer as a controller controlling them. The computer can centrally control the operation, trouble, etc. of the printers. This makes it possible to repair the printers efficiently and, if one of them cannot be used, to substitute another for it.

It is conceivable that a server computer is connected to the network to collect information on the terminals. The controller can communicate with the server computer to obtain the information on all the terminals, thereby making the processing efficient and rapid. The use of the server computer, however, complicates the structure of the network system and increases the cost of equipment for this system.

SUMMARY OF THE INVENTION

It is a first object of the invention to provide a terminal and a network system via which this terminal and other terminals are interconnected and which includes a controller controlling the terminals via the network, the terminal and the system making it possible to obtain information on the terminals efficiently without using a server computer.

It is a second object to provide a process for controlling a plurality of terminals in a network system which are interconnected via a network and controlled by a controller via the network, the process being able to obtain information on the terminals efficiently without using a server computer.

It is a third object to provide a recording medium in which a program for the process is recorded.

In accordance with a first aspect of the invention, a network system is provided, which includes a plurality of terminals interconnected via a network and controlled by a controller via the network. At least one of the terminals will be referred to below as a specified terminal or specified terminals. The or each specified terminal includes an information obtaining means for obtaining information on the other terminals from them, and a transmitting means for transmitting to the controller together with information on this terminal the information obtained about the other terminals by the information obtaining means.

The information obtaining means of the or each specified terminal can obtain the information on the other terminals from them. The transmitting means of this terminal can transmit to the controller together with the information on the terminal the information obtained about the other terminals by the information obtaining means. Therefore, by obtaining the information only from the or each specified terminal, the controller can obtain together with it the information on the other terminals as well. This makes it possible to obtain the information on the terminals efficiently without using a server computer.

The or each specified terminal need not obtain the information on all other terminals, but may obtain the information on a part of the other terminals.

The terminals may be printers and scanners. Part of the printers may obtain information on all others. Part of the scanners may obtain information on all others.

The information obtaining means and the transmitting means of the or each specified terminal may be a CPU.

The information on each of the terminals other than the or each specified terminal may include link information for identifying the associated terminal on the network. The link information may be a URL, and represents the location of the information on the associated terminal to identify this terminal on the network. Once the link information is found, it is easy to obtain detailed information on the terminal on the basis of the link information. Therefore, if each of the other terminals includes link information, it is possible to reduce amount of the information which the information obtaining means needs to obtain and the transmitting means needs to transmit. This further reduces amount of the information processed by the information obtaining means and the transmitting means, and thereby makes their processing speeds higher.

The network system may further include an interface interconnecting the or each specified terminal and the network. The controller may further include an interface information obtaining means for obtaining information on the interface from this interface when the terminal transmits the information on all the terminals to the controller. This makes it easy to control the interface, and very easy to update the version of the terminal.

The controller may further include a changing means for changing the setting or settings of the terminal transmitting the information to the controller, or of the interface. This makes it possible to remotely control the or each specified terminal or the interface. It further improves the operability of the whole system to be able to remotely control the terminal or the interface.

In accordance with a second aspect of the invention, another network system is provided, which includes a plurality of terminals interconnected via a network and controlled by a controller via the network. At least two of the terminals will be referred to below as specified terminals. Each of the specified terminals includes an information obtaining means for obtaining information on all other interconnected terminals from them, and a transmitting means for transmitting to the controller together with information on this terminal the information obtained about the other terminals by the information obtaining means. The controller includes a selecting means for selecting one of the specified terminals, a requesting means for requesting the transmitting means of the terminal selected by the selecting means to transmit to the controller the information on all the interconnected terminals, and a switching means for switching from the selected terminal to the other or another specified terminal.

The selecting means and the switching means may include icons displayed on a screen of the controller. The requesting means may include a printer research request signal generated by the CPU of the controller.

This network system comparatively reduces amount of the information which the specified terminals need to obtain from each other. Specifically, it is possible to select one of the specified terminals with the selecting or switching means of the controller, as the need arises, and obtain detailed information on the selected terminal. This further reduces amount of the information processed by the information obtaining means and the transmitting means of the specified terminals, and thereby makes their processing speeds higher.

In accordance with a third aspect of the invention, still another network system is provided, which includes a plurality of terminals interconnected via a network and controlled by a control computer via the network. At least one of the terminals will be referred to below as a specified terminal or specified terminals. The or each specified terminal includes a controller for obtaining information on the other terminals from them, and transmitting the obtained information on them together with information on this terminal to the computer.

By obtaining the information only from the or each specified terminal, the control computer can obtain together with it the information on the other terminals as well. This makes it possible to obtain the information on the terminals efficiently without using a server computer. The controller of the or each specified terminal may be a CPU.

In accordance with a fourth aspect of the invention, a (specified) terminal is provided for connecting via a network to a plurality of other terminals. This terminal includes an information obtaining means for obtaining information on the other terminals from them, and a transmitting means for transmitting to the network together with information on this terminal the obtained information on the other terminals by the information obtaining means.

The information obtaining means of this terminal can obtain the information on the other terminals from them. The transmitting means of the terminal can transmit to the network together with the information on this terminal the information obtained about the other terminals by the information obtaining means.

This terminal may be used as one of the terminals interconnected via a network in a network system and controlled by a controller via the network. In this case, the system produces effect similar to that produced by the systems according to the first, second and third aspects.

As is the case with the terminals of the network systems according to the first, second and third aspects, this terminal need not obtain the information on all other terminals, but may obtain the information on a part of them.

The information on each of the terminals connected to this terminal may include link information for identifying the associated terminal on the network. This further reduces amount of the information processed by the information obtaining means and the transmitting means, and thereby makes their processing speeds higher.

In accordance with a fifth aspect of the invention, a process is provided for controlling by means of a controller connected to a network a plurality of terminals connected to the network. The process includes the steps of:

selecting one of the terminals;

causing the selected terminal to obtain information on the other terminals; and causing the selected terminal to transmit the obtained information on the other terminals together with information on itself to the controller.

This process makes it possible to take out from the selected terminal the information on the other terminals as well. This makes it very easy to confirm or check the operation of the terminals connected to the network, and to control the switching of them.

The selected terminal may function to obtain the information on the other terminals from them, and transmit the obtained information on them together with the information on itself to the controller.

In accordance with a sixth aspect of the invention, a recording medium is provided. Recorded in this medium is a program for execution by a controller in a network system including a plurality of terminals interconnected via a network and controlled by the controller via the network. At least two of the terminals will be referred to below as specified terminals. Each of the specified terminals can obtain information on all other interconnected terminals from them, and transmit the obtained information on them together with information on itself to the controller. The program includes the steps of selecting one of the specified terminals, and requesting the selected terminal to transmit the information on all the interconnected terminals to the controller.

The controller may be a computer. By executing the software program stored in the recording medium, the computer can select one of the specified terminals, and request it to transmit the information on all the terminals to the computer. This makes it easy to control the interconnected terminals through one of them on the controller.

The program may further include the step of switching from the selected terminal to the other or another specified terminal.

The network system may further include an interface interconnecting each of the specified terminals and the network. The program may further include the step of obtaining information on the interface connected to the selected terminal from the interface when this terminal transmits the information on all the interconnected terminals to the controller.

The program may further include the step of changing the setting or settings of the terminal transmitting the information to the controller, or of the interface connected to this terminal.

BRIEF DESCRIPTION OF THE DRAWINGS

A preferred embodiment of the invention is shown in the accompanying drawings, in which.

DETAILED DESCRIPTION OF A PREFERRED EMBODIMENT

The invention is embodied by a network system controlled with a so-called WWW, a wide-area information system through which any information is accessible with a hypertext built on a network.

In outline, a WWW is an information system for monistically controlling the network control information on terminals like the printers of this embodiment of the invention by means of a browser computer. This computer is provided with a program called a WWW browser, with which the settings etc. of the terminals can be inspected in order of precedence to be grasped. This enables the network to be controlled. Software called a hypertext is used to express the picture and/or character information showing the conditions of the terminals. A so-called HTTP is used as the protocol for the communication between the computer and the terminals. A so-called HTML (hypertext markup language) may be used as the language for expressing the hypertext.

Each printer of the embodiment is connected to an NIC, which plays a role as a server computer. The NIC is a processor for providing the printer with data, control information and/or the like. In the embodiment of the invention, a program called a CGI (common gateway interface) is installed in the printer. The CGI can form the HTML specified by a browser computer, and interpret the form transmitted from the browser computer to the NIC. The CGI for the NIC is usually contained in a server computer. For example, if the user of the browser computer sets 5 copies for the printer, this computer transmits the form "COPIES=5" to the CGI. The browser computer can identify and designate each printer by identification information called a URL. The URL of the printer differs from that of the associated NIC.

Figure 1:
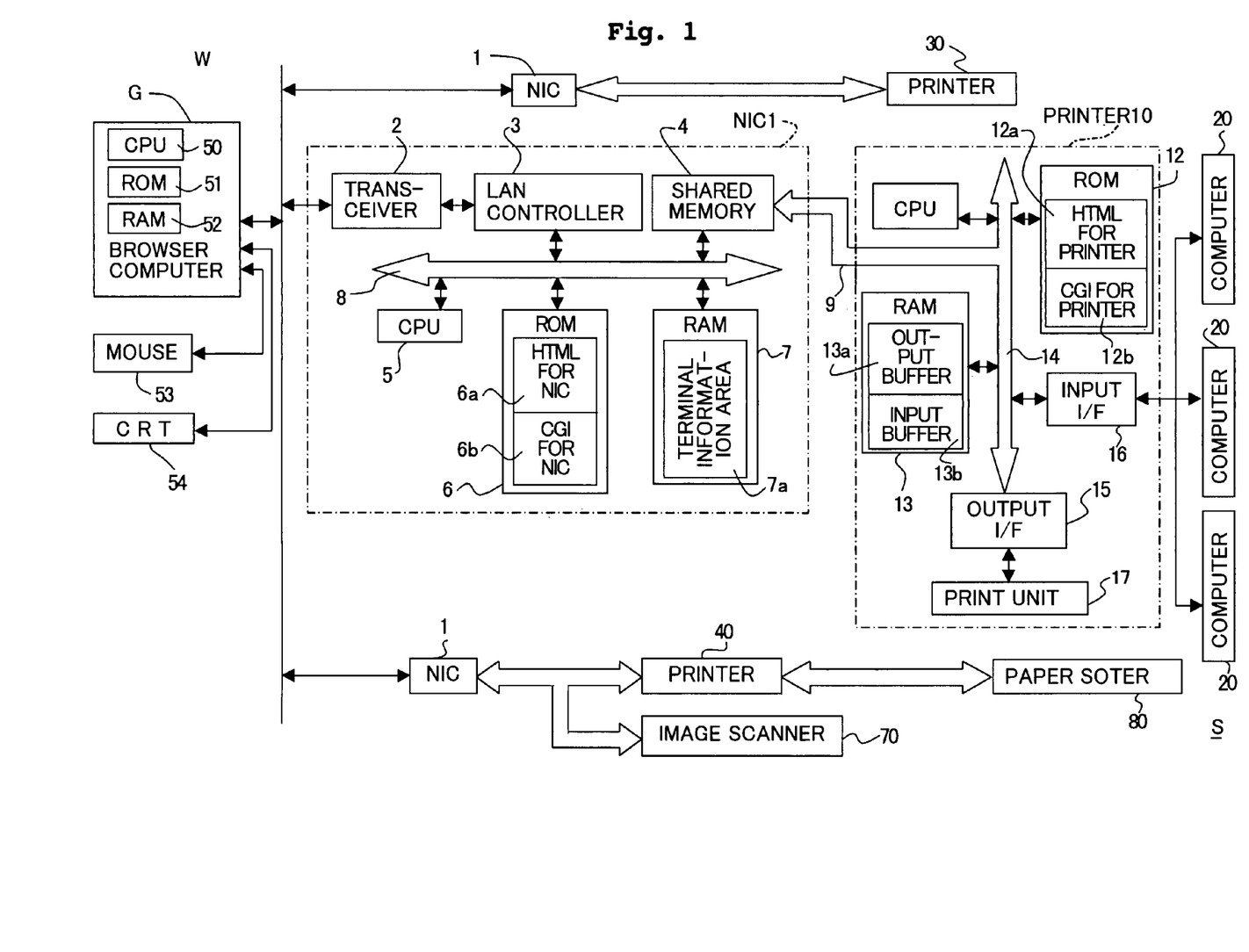
FIG. 1 is a block diagram of a network system embodying the invention.

With reference to FIG. 1, the network system S according to the embodiment consists of the browser computer G as a controller, a network W such as a telephone network and a LAN, the NICS 1 as interfaces, the printers 10, 30 and 40 as terminals, computers 20 connected to the printer 10, an image scanner 70 connected in parallel to the printer 40, and a paper sorter 80 connected in series to the printer 40. The printers 10, 30 and 40 are of different types, and are specified terminals as defined in the Summary of the Invention, but only one or two of them might be a specified terminal.

The browser computer G includes a CPU 50, a ROM 51 and a RAM 52, and is connected to a mouse 53 and a CRT 54.

Each NIC 1 includes a transceiver 2 as a communicating means, a LAN controller 3, a shared memory 4, a CPU 5, a ROM 6, a RAM 7 and a bus 8. Stored in advance in the ROM 6 are the HTML 6a for the NIC and the CGI 6b for the NIC.

The printer 10 includes a CPU 11, a ROM 12, a RAM 13, a bus 14, an output interface 15, an input interface 16 and a print unit 17. Stored in advance in the ROM 12 are the HTML 12a for the printer and the CGI 12b for the printer. The printer 10 is connected to one of the NICs 1 via a line 9, which is connected to the bus 14. The printer 10 is also connected to the computers 20 via the input interface 16.

The operation of the network system S will be summarized below with reference to FIG. 1. Only the processes at the printer 10 and the associated NIC 1 will be described, because they are similar to the processes at the printers 30 and 40, and at the associated NICs 1.

The CPU 50 of the browser computer G can generate a request to the printer 10 for the information required so that the condition of this printer can be grasped with this computer. The request is transmitted via the network W to the transceiver 2 of the NIC 1 connected to the printer 10. The transceiver 2 demodulates the request, and outputs the demodulated request via the LAN controller 3 to the bus 8.

The request may be:

1. "GET /nic/****. html HTTP/1.0";
2. "GET /nic-CGI/****. exe HTTP/1.0";
3. "GET /printer/****. html HTTP/1.0"; or
4. "GET /printer-CGI/****. exe HTTP/1.0".

"GET" is the head word of the request;
"nic", "nic-CGI", "printer" and "printer-CGI" are URLs;
"**. html" and ". exe" are each an object of control commonly called a resource, the name of which appears actually at "**";
"HTTP/1.0" is a version of an HTTP.

The request includes either of the URL "nic" or "nic-CGI" representing the NIC 1 and the URL "printer" or "printer-CGI" representing the printer 10.

If the request received by the NIC 1 includes the URL "printer" or "printer-CGI" (as included in the request 3 or 4 above), which represents the printer 10, the CPU 5 of the NIC transfers the request to the printer 10 via the shared memory 4, in which this CPU writes the request, and via the line 9. After writing the request in the memory 4, the CPU 5 outputs an interrupt command to the CPU 11 of the printer 10 via a signal line (not shown), and executes the process for the request. Stored previously in the ROM 6 of the NIC 1 is the control program necessary for the NIC CPU 5 to process the request.

When the request designating the printer 10 is transferred from the NIC 1 via the line 9 to this printer, the printer CPU 11 receives the request via the bus 14, and processes it by using the printer HTML 12a and CGI 12b, which are stored in the ROM 12. If the request can be processed with the HTML 12a only, it is processed therewith. If the request can be processed with the CGI 12b only, it is processed therewith. The CPU 11 sends a response as the result of this processing via the bus 14, the line 9 and the shared memory 4 to the NIC 1. Stored in advance in the printer ROM 12 is the control program for the CPU 11 to process the request.

When the NIC 1 receives from the printer 10 the response to the request to be processed in this printer, this NIC transfers the response as it is via the network W to the browser computer G.

When the browser computer G receives the response from the printer 10, the CRT 54 displays the picture and/or character information corresponding to the received response so that the operation. etc. of the NIC 1 and/or the printer 10 can be grasped.

The three NICs 1 are identical, but the types of printers 10, 30 and 40 are different. Specifically, different HTMLs for printers or different CGIs for printers are stored in the printers. Other printers (not shown) may be connected to the network W each via another NIC (not shown), the type of which differs from that of the NICs 1.

The printer 10 can obtain information on the NIC 1 connected to it, and about the other printers and NICs connected via the network W. When the printer 10 receives a request from the browser computer G, this printer sends the computer G a response including the information on the other printers. This process will be described below in detail.

Figure 5:
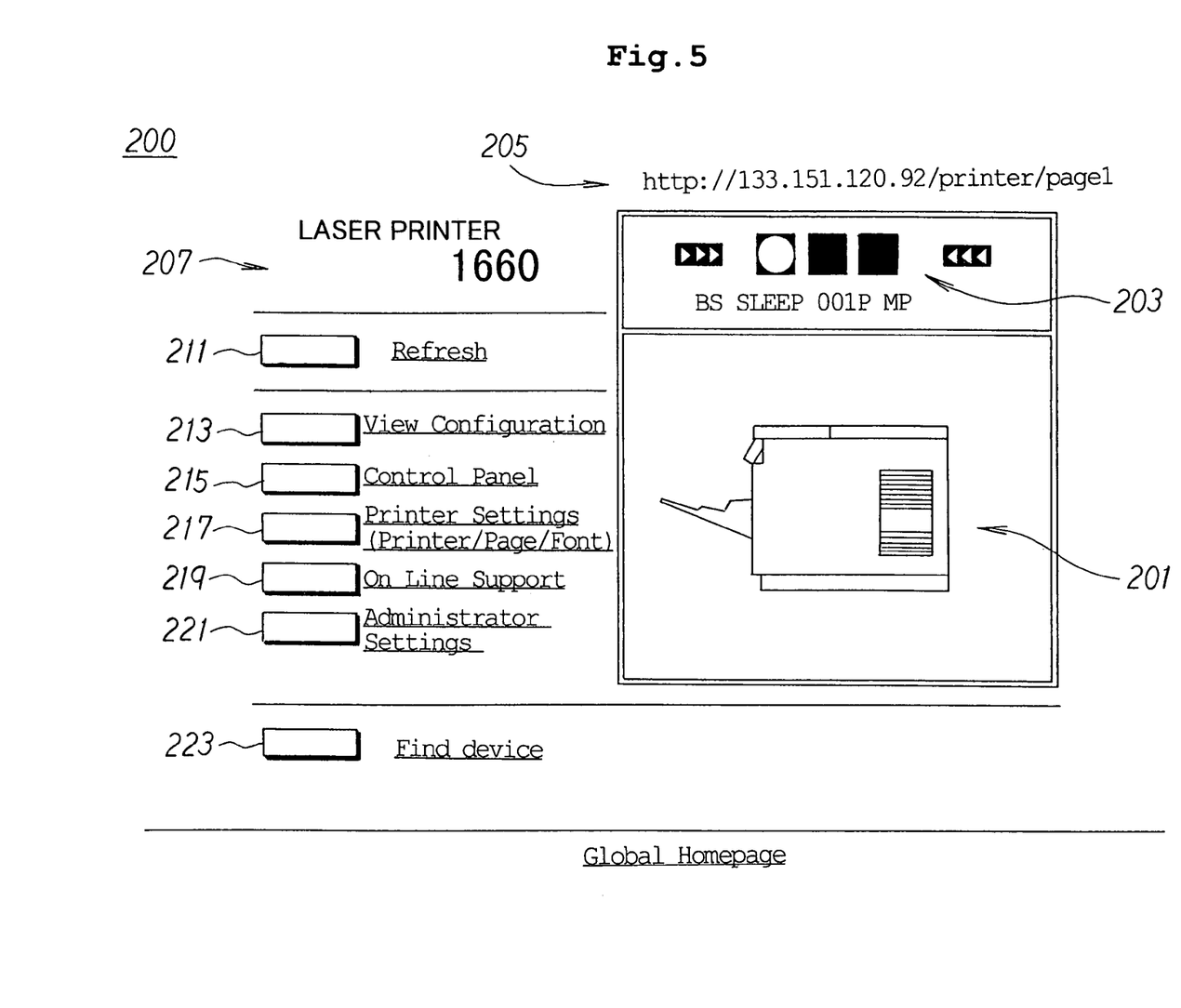
FIG. 5 shows an example of a printer page (screen page) on the CRT of this system.

Each device or apparatus can be identified on the network W by its IP address, which is a kind of network address. If the user designates the IP address of the printer 10 on the browser computer G, and presses the return key of this computer, the computer starts the process shown in FIG. 2. At the step S1 of this process, the CRT 54 displays the printer page 200 for the printer 10. FIG. 5 shows an example of the page 200.

With reference to FIG. 5, the printer page 200 contains:
an image 201 showing the condition of the printer 10;
a set of red, yellow and blue pilot lamps 203 in the form of a traffic light showing the printer condition;
the URL 205 showing the location of the information on the printer 10;
the printer type 207;
a Refresh button 211;
a View Configuration button 213;

a Control Panel button 215;
a Printer Settings button 217;
an On-Line Support button 219;
an Administrator Settings button 221; and
a Find-device button 223.

These buttons can be clicked with the mouse 53, which is connected to the browser computer G. The Refresh button 211 is to instruct the computer G to read the information on the printer 10 again. The View Configuration button 213 is to display on the CRT 54 the version of and/or other information on the printer 10. The Control Panel button 215 is to display the control panel of the printer 10 on the CRT 54 so that the panel can be operated remotely. The Printer Settings button 217 is to enter or change settings of the printer 10 with the computer G. The On-Line Support button 219 is to open the home page of the maker of the printer 10 to display support information on the CRT 54. The Administrator Settings button 221 is to display the NIC information page, which will be explained later, on the CRT 54. The Find-device button 223 is to list on the CRT 54 the information on all the printers connected to the network W.

The step S1 requires the browser computer G to transmit a request for status information to the printer 10. The CPU 11 of the printer 10 has started the process shown in FIG. 3. In response to the request, the printer CPU 11 sends information to the computer G as follows.

Figure 3:
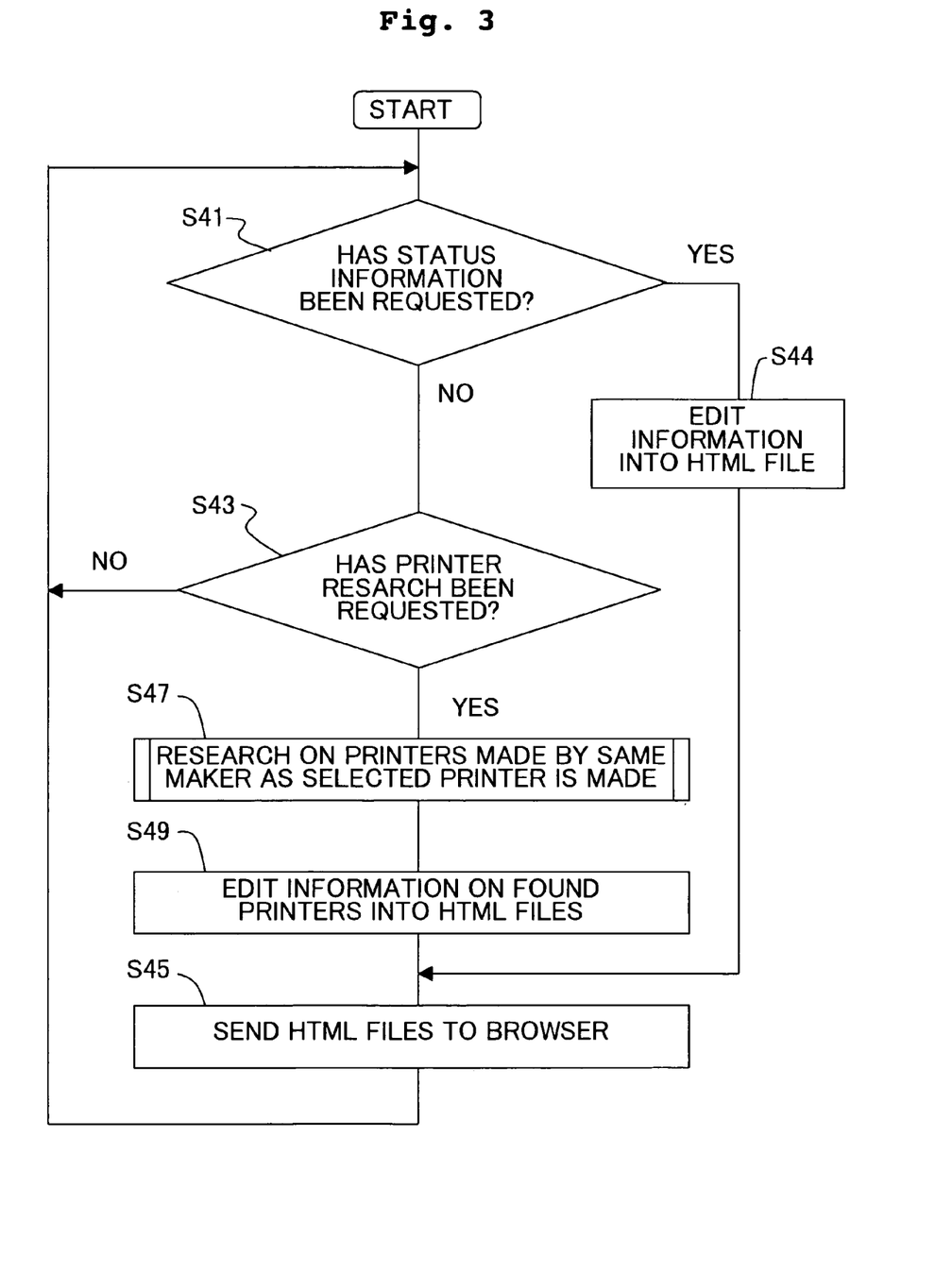
FIG. 3 is a flowchart of the process executed by a printer of this system.

With reference to FIG. 3, the printer CPU 11 can execute a loop by alternately judging whether there is a request for status information (S41) and whether there is a request for printer research (S43). If there is a request for status information, the process of FIG. 3 goes to the step S44, where the status information on the printer 10 is edited into an HTML file. At the next step S45, this file is sent to the browser computer G. Then, the process returns to the loop of steps S41 and S43.

On the basis of the status information, the browser computer G displays the printer page 200 (S1), an example of which is shown in FIG. 5. At the next step S3 in FIG. 2, it is judged whether any of the buttons 211, 213, 215, 217, 219, 221 and 223 has been clicked on the printer page 200. The computer G stands by until one of the buttons is clicked. If the Find-device button 223 has been clicked, the CRT 54 displays the Find-device page 300 (S7), an example of which is shown in FIG. 6.

Figure 6:
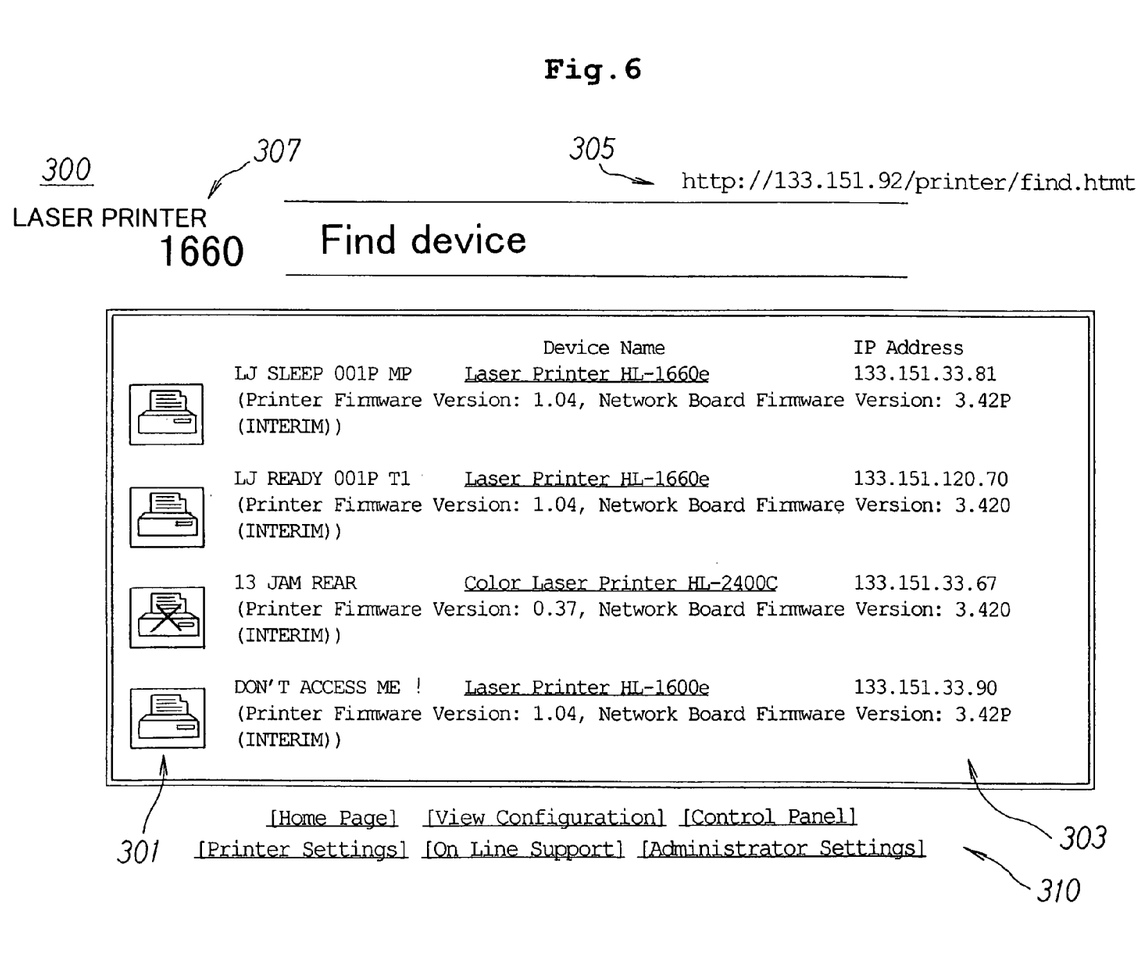
FIG. 6 shows an example of the Find-device page on the CRT.

With reference to FIG. 6, the Find-device page 300 contains:
icons 301 each representing one of the printers connected to the network W;
information 303 about the printers;
the URL 305;
the printer type 307; and
buttons 310 similar to the buttons 211, 213, 215, 217, 219, 221 and 223 on the printer page 200.

The color of each icon 301 is that of the pilot lamp (203 in FIG. 5, 203a in FIG. 7, or another) lighting up on the corresponding printer page (200, 200a or another).

Figure 2:
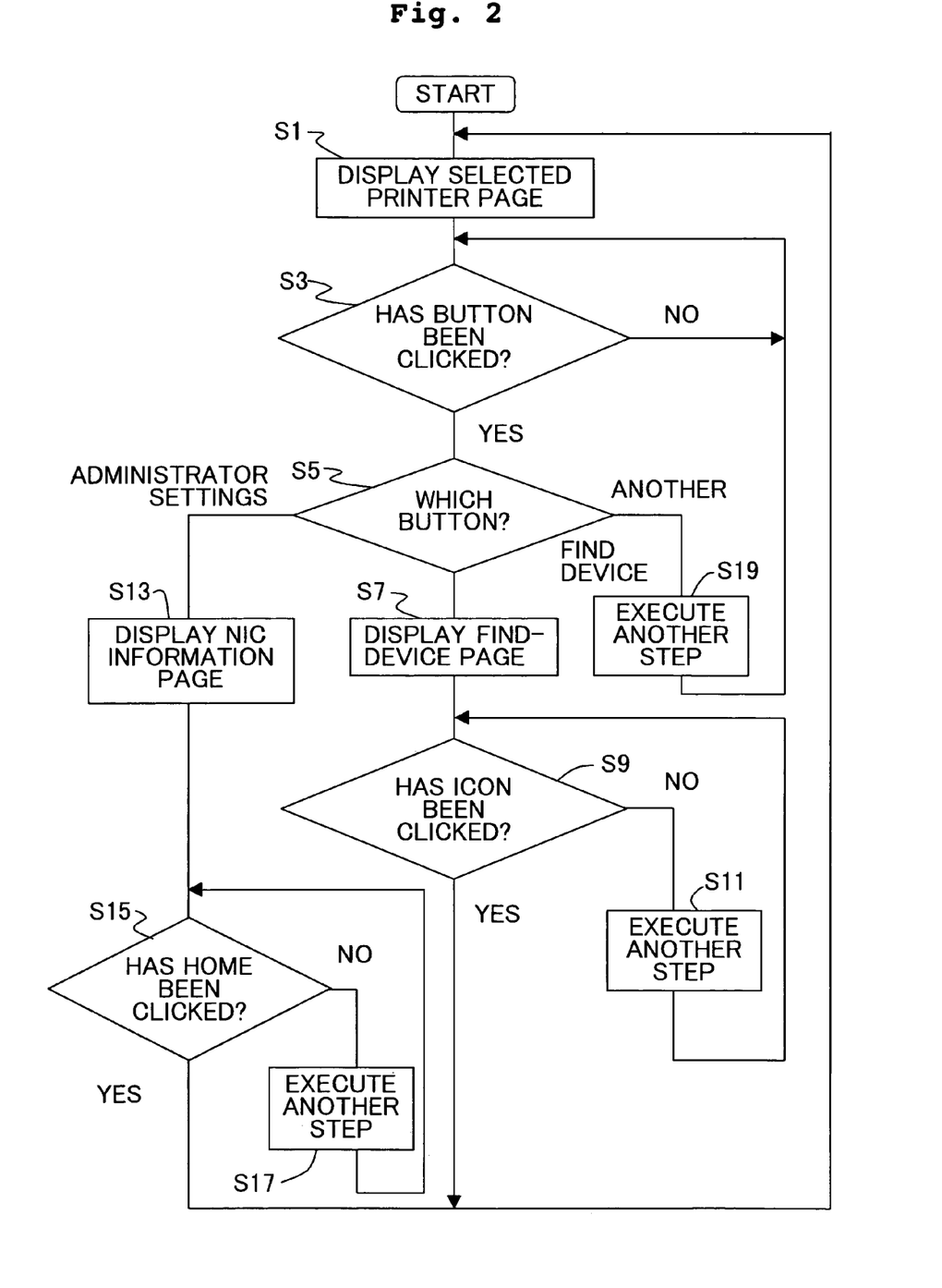
FIG. 2 is a flowchart of the process executed by the browser computer of this system.

The step S7 in FIG. 2 requires the browser computer G to transmit a request for printer research to the printer 10. This causes the printer CPU 11 to judge yes or affirmatively at the step S43 in FIG. 3. Then, the process of FIG. 3 goes to the step S47, where the CPU 11 executes the process shown in FIG. 4 for researching on any printers connected to the network W and made by the same maker as the printer 10 is made.

Figure 4:
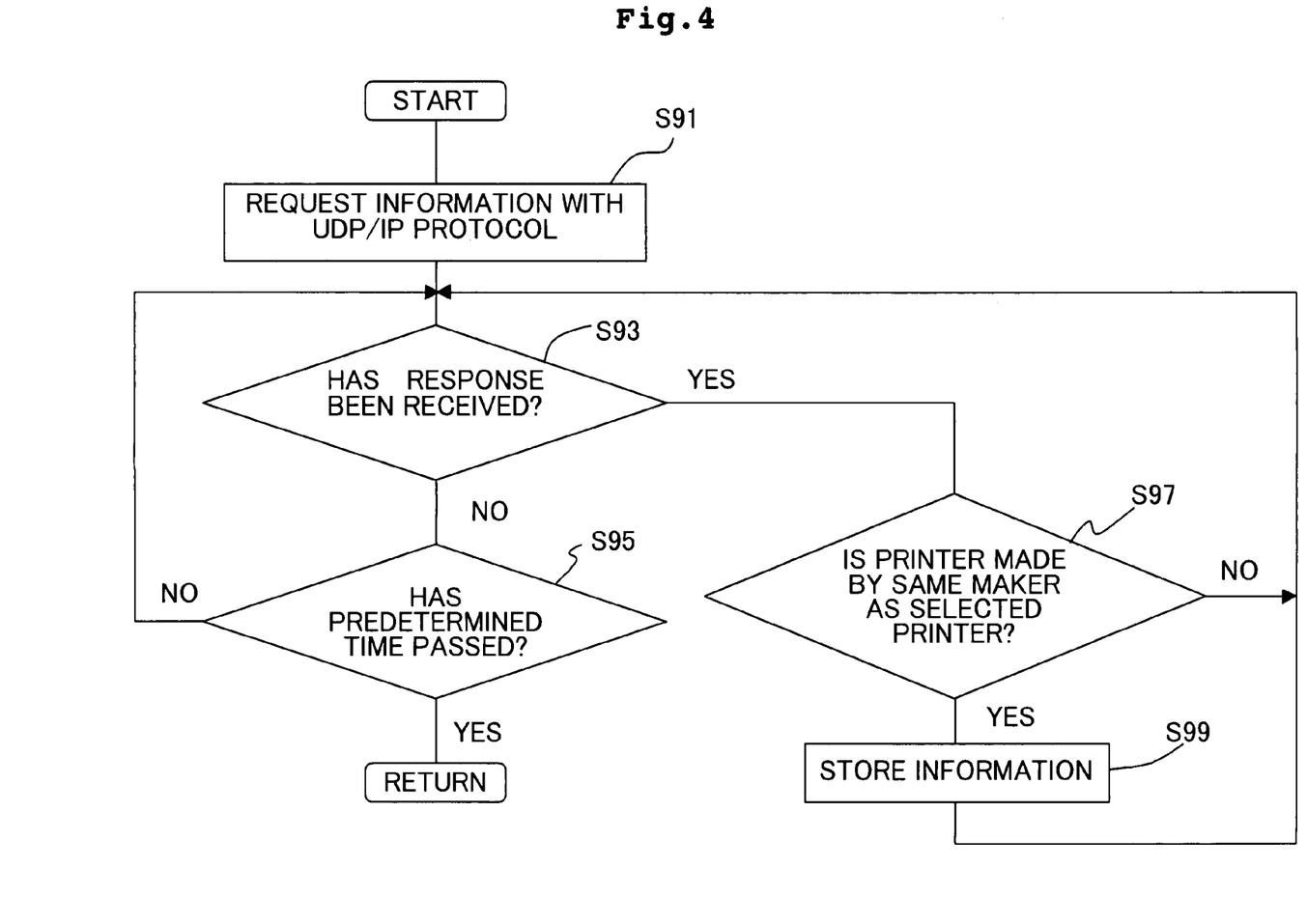
FIG. 4 is a flowchart of the researching process during the process of FIG. 3.

At the first step S91 in FIG. 4, the printer 10 transmits a request for information with the UDP/IP protocol to each of the other printers. At the next step S93, it is judged whether there is a response to the request. If there is no response, the process of FIG. 4 goes to the step S95, where it is judged whether a predetermined time has passed. If the time has not passed, the process returns to the step S93. If a response is received during the loop of steps S93 and S95, the process goes from the step S93 to the step S97, where it is judged whether the response is received from a printer made by the same maker as the printer 10 is made. If the response is from a printer made by another maker, the process returns to the loop of steps S93 and S95.

The information request transmitted at the step S91 and the response received at the step S93 include a trademark of the maker of the printer 10 or another key word, from which it is possible to judge whether a printer is made by this maker. In response to this request, each of the printers produces a random number, and waits for milliseconds in accordance with this number until it sends information on itself to the browser computer G. Therefore, pieces of device information on the printers are sent via the network W to the computer G at different times in accordance with the random number.

If it is judged at the step S97 that the response is from a printer made by the same maker as the printer 10 is made, the process of FIG. 4 goes to the step S99, where the information =included in the response is stored in the RAM 13 of the printer 10. The process then returns to the loop of steps S93 and S95. When the predetermined time has passed after the process starts, the printer CPU 11 judges yes at the step S95, and then returns to the process in FIG. 3. At the next step S49 in FIG. 3, the CPU 11 edits into an HTML file the information stored during the predetermined time at the step S99 in FIG. 4 about each of the printers made by the same maker as the printer 10 is made. At the next step S45 in FIG. 3, the HTML files on those printers are sent to the browser computer G. The CPU 11 then returns to the loop of steps S41 and 43.

Figure 7:
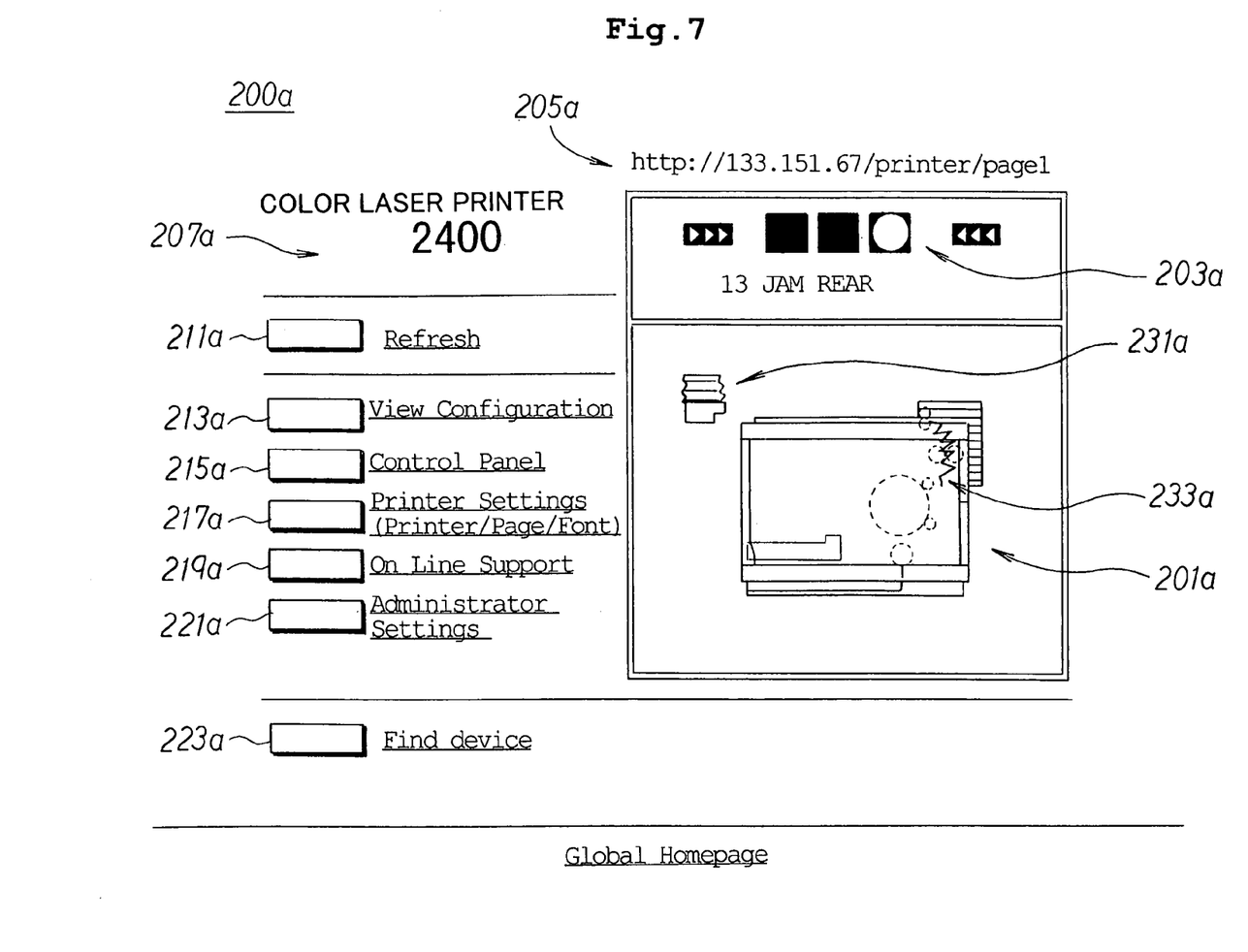
FIG. 7 shows an example of another printer page on the CRT.

At the step S7 in FIG. 2, the Find-device page 300 (FIG. 6) is displayed on the basis of the thus received printer information. At the next step S9, it is judged whether any of the icons 301 has been clicked on the page 300. Until one of the icons 301 is clicked, the browser computer G waits, executing another step (S11), which may be the process started by one of the buttons 310 being clicked. If one of the icons 301 has been clicked, the process of FIG. 2 returns to the step S1, where the CRT 54 displays the printer page 200a, an example of which is shown in FIG. 7, for the printer corresponding to the clicked icon 301. Because this page 200a is similar to the page 200 (FIG. 5), the description of it is omitted, with the subscript or index "a" added to the reference numerals representing most parts in FIG. 5.

In the example of the page 200a shown in FIG. 7, the image 201a includes a representation 231a showing a jam occurring in the corresponding printer and another representation 233a flashing to show where the jam is occurring. While a jam is occurring in the printer, the red pilot lamp 203a is lighting up.

The pages 200 and 200a thus show the printer conditions.

Figure 8:
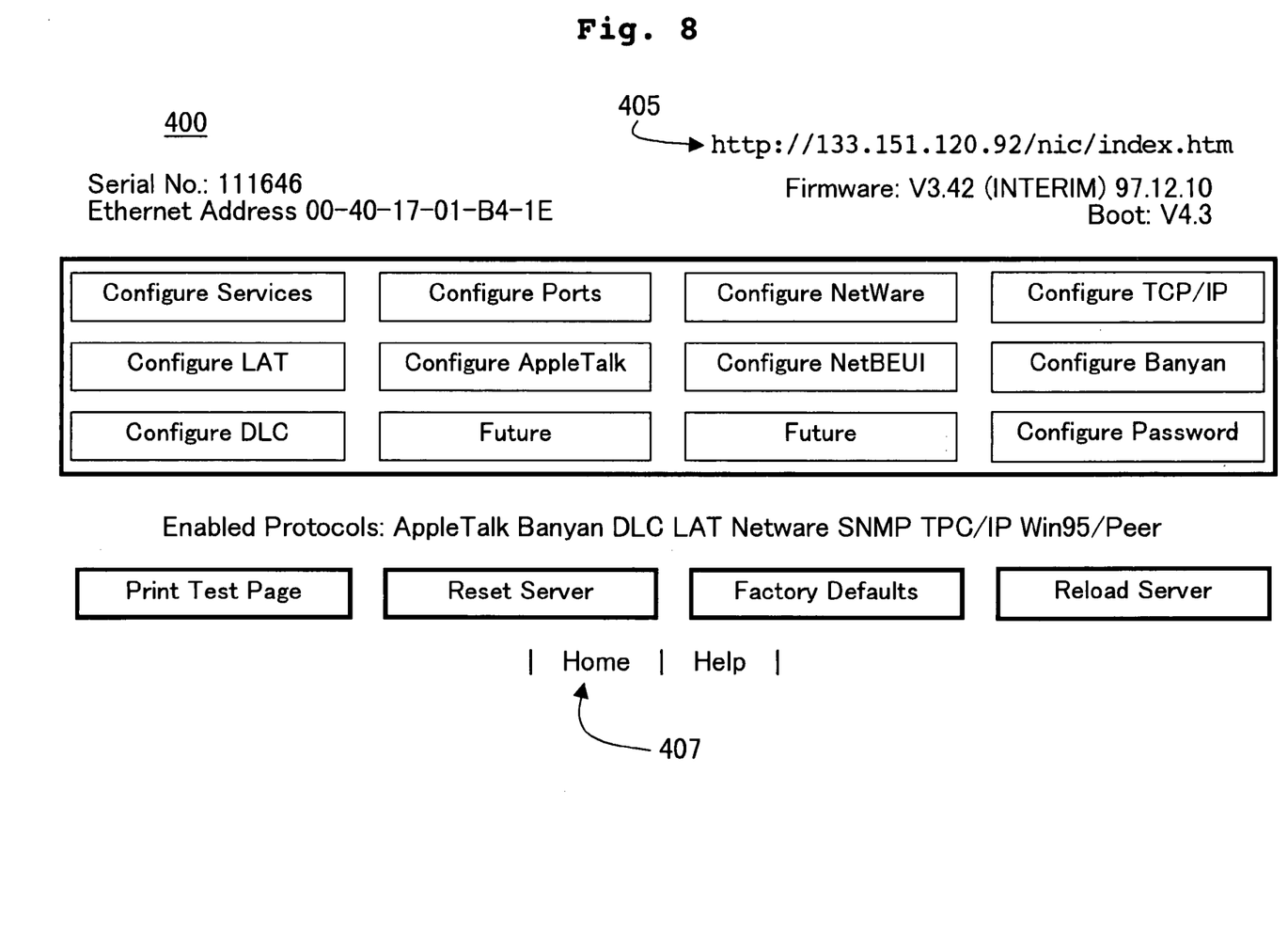
FIG. 8 shows an example of an NIC information page on the CRT.

If the Administrator Settings button 221 or 221a has been clicked on the printer page 200 or 200a, respectively, the process of FIG. 2 goes from the step S5 to the step S13, where the CRT 54 displays the NIC information page 400, an example of which is shown in FIG. 8, for the NIC 1 associated with the printer page. The NIC information page 400 contains information on the NIC 1, thereby making it possible to update the firmware, set the NIC environment and carry out other processes. This page 400 includes the URL 405 of the NIC 1 at its top and a Home button 407 at its bottom for return to the printer page.

At the step S15 following the step S13 in FIG. 2, it is judged whether the Home button 407 has been clicked on the NIC information page 400. If this button 407 has been clicked, the process of FIG. 2 returns to the step S1, where the CRT 54 displays the printer page 200 or 200*a* associated with the information page 400. If the button 407 has not been clicked, the process goes to the step S17, where another step is executed, which may include updating the firmware. The process then returns to the step S15.

If one of the buttons 211, 213, 215, 217 and 219 on the printer page 200 or one of the buttons 211*a*, 213*a*, 215*a*, 217*a* and 219*a* on the page 200*a* has been clicked, the process of FIG. 2 goes from the step S5 to the step S19, where the browser computer G executes the step associated with the clicked button. The process then returns to the step S3, where the computer G waits until one of the buttons is clicked on the printer page.

Thus, each of the printers interconnected via the network W can obtain the information on the others from them, and transmit it together with the information on itself to the browser computer G. Therefore, by obtaining the information from one of the printers, the computer G can obtain together with it the information on the others. In the network system S, it is possible to obtain the information on the printers efficiently without using a server computer.

The URLs of the printers can be sent together with the status information on the printers to the browser computer G. On the basis of the URLs or other link information, the computer G can easily obtain detailed information on the printers. This reduces the information content which each of the printers needs to obtain from the others, and the information content which needs to be transmitted to the computer G. It is possible to further reduce the information content processed by the system, and therefore improve the processing speed of the system.

By clicking one of the icons 301 on the Find-device page 300, it is possible to select the printer from which the information is needed. After clicking the Find-device button 223 or 223*a* on the printer page 200 or 200*a*, respectively, it is also possible to switch to another printer by clicking the corresponding icon 301. This comparatively reduces the information content which each of the printers needs to obtain from the others. That is to say, it is possible to select a desired printer as the need arises, and obtain the information on the associated NIC 1 or other detailed information.

By displaying the NIC information page 400, it is possible to obtain the information on the associated NIC 1 as an interface. This makes it easy to control the NIC 1, and very easy to improve the version of the associated printer by updating the firmware. It is possible to change the settings of each printer or the associated NIC on either the associated printer page (200, 200*a* or another) or the associated NIC information page (400 or another). This makes it possible to control the printer and the NIC remotely.

The step S47 and the process of FIG. 4 correspond to the information obtaining step. The step S45 corresponds to the information transmitting step. To click one of the icons 301 at the step S9 corresponds to the terminal selecting step. The steps S5, S7 and S9 correspond to the switching step. The step S13 corresponds to the interface information obtaining step. To click the Control Panel button 215 or 215*a* or the Printer Settings button 217 or 217*a* at the step of S19 corresponds to the setting changing step.

The invention is not limited to the embodiment, but various modifications can be made without departing from the spirit of the invention. For example, each of the printers interconnected via the network W need not obtain information on all other printers, but may obtain information on part of them.

The network system S might include printers and scanners as terminals which are interconnected via the network W. In this case, part of the printers may obtain information on all other printers, and part of the scanners may obtain information on all other scanners.

The processes shown in FIGS. 2–4 are stored in the ROMs and RAMS, but might otherwise be stored in CD-ROMS, floppy disks, optical magnetic disks, hard disks, a file server on the Internet, or other storage media, or read in a personal computer.

In the above embodiment, information on the printers manufactured by the maker which manufactured the specified printer 10 is obtained by the specified printer 10. However, information on the printers manufactured by a different maker form the maker of the specified printer 10 may be obtained by the specified printer 10 by using a typical protocol such as SMNP.

The invention can be applied to, not only print systems including printers, but also communication karaoke systems and other network systems.

What is claimed is:

1. A network system comprising:
   a plurality of terminals interconnected via a network; and
   a controller that controls the terminals via the network;
   the controller comprising:
   selecting means for selecting one or the plurality of terminals based on a user's designation; and
   requesting means for requesting the selected terminal to transmit, to the controller, information on all the interconnected terminals;
   wherein the selected terminal transmits a request to the other interconnected terminals to obtain the information on the other interconnected terminals, the other interconnected terminals forward to the selected terminal the information on the other interconnected terminals in response to the request, the selected terminal forwards to the controller the information from the other interconnected terminals and information on the selected terminal, and the information on each of the other interconnected terminals includes link information for identifying the each terminal on the network.

2. A network system according to claim 1 wherein at least two terminals are selected by the selecting means, and one of the at least two terminals is designated by the controller.

3. The network system defined in claim 1, further comprising:
   an interface interconnecting the at least one terminal and the network;
   the controller further including an interface information obtaining means for obtaining information on the interface therefrom when the at least one terminal transmits the information on all the terminals to the controller.

4. The network system defined in claim 3, wherein the controller further includes a setting changing means for changing the setting or settings of the terminal transmitting the information to the controller, or of the interface.

5. The network system defined in claim 1, wherein the at least one terminal further includes a memory for storing the information on all the terminals.

6. The network system defined in claim 1, wherein each of the interconnected terminals is a printer or a scanner.

7. A network system according to claim 1 wherein the selected terminal judges whether or not each of the other terminals is made from a same maker as the selected terminal.

8. A network system according to claim 7 wherein if the one of the other terminals is made from the same maker as the selected terminal, the selected terminal obtains information on the one of the other terminals.

9. A network system according to claim 7 wherein a list of the information collected on the selected terminal is displayed on a display of the controller, and, when a terminal on the network is specified on the display, information on the specified terminal is displayed on the display.

10. A network system comprising:
a plurality of terminals interconnected via a network; and
a control computer controlling the terminals via the network;
wherein at least one of the terminals selected by the control computer based on a user's designation transmits a request to the other terminals to obtain the information on the other terminals, the other interconnected terminals forward to the selected terminal the information on the other terminals in response to the request, and the at least one of the selected terminals forwards to the control computer the information from the other terminals and information on the selected terminal.

11. The network system defined in claim 10, wherein the at least one terminal further includes a memory for storing the information on all the terminals.

12. The network system defined in claim 10, wherein each of the interconnected terminals is a printer or a scanner.

13. A network system according to claim 10 wherein the selected terminal judges whether or not each of the other terminals is made from a same maker as the selected terminal.

14. A network system according to claim 13 wherein if the one of the other terminals is made from the same maker as the selected terminal, the selected terminal obtains information on the one of the other terminals.

15. A network system according to claim 13 wherein a list of the information collected on the selected terminal is displayed on a display of the controller, and, when a terminal on the network is specified on the display, information on the specified terminal is displayed on the display.

16. A terminal for connecting via a network to a plurality of other terminals, the terminal comprising:
requesting means for requesting the other terminals to obtain information on the other terminals, wherein the other terminals forward the information on the other terminals in response to the request, and to forward the obtained information on the other terminals to the terminal; and
a transmitting means for transmitting to the network information on the terminal and the obtained information on the other terminals based on a request from the network.

17. The terminal defined in claim 16, wherein the information on each of the other terminals includes link information for identifying the each terminal on the network.

18. The terminal defined in claim 16, further comprising a memory for storing the information on the other terminals.

19. The terminal defined in claim 16, which is a printer or a scanner.

20. A process for controlling by a controller connected to a network a plurality of terminals connected to the network, the process comprising the steps of:
selecting one of the terminals through the controller based on a user's designation,
causing the selected one of the terminals to transmit a request to the other terminals to obtain information on the other terminals, and wherein the other terminals forward to the selected terminal the information on the other terminals in response to the request; and
causing the selected terminal to transmit the obtained information on the other terminals and information on the selected terminal to the controller.

21. The process defined in claim 20, wherein the selected terminal is adapted to obtain the information on the other terminals therefrom, and transmit the obtained information on the other terminals and the information on the selected terminal to the controller.

22. A network system according to claim 20 wherein the selected terminal judges whether or not each of the other terminals is made from a same maker as the selected terminal.

23. A network system according to claim 22 wherein if the one of the other terminals is made from the same maker as the selected terminal, the selected terminal obtains information on the one of the other terminals.

24. A network system according to claim 22 wherein a list of the information collected on the selected terminal is displayed on a display of the controller, and, when a terminal on the network is specified on the display, information on the specified terminal is displayed on the display.

25. A recording medium that stores a program for execution by a controller in a network system including a plurality of terminals interconnected via a network and controlled by the controller via the network,
at least two of the terminals being each adapted to obtain information on the other terminals therefrom, and transmit the obtained information on the other terminals and information on the each terminal to the controller,
the program including the steps of:
selecting one of the at least two terminals through the controller based on a user's designation; and
requesting the selected terminal to transmit a request to the other terminals to obtain the information on the other terminals, the other terminals forward to the selected terminal the information on the other terminals in response to the request, and the selected terminal forwards to the controller the information on the other terminals and information on the selected terminal.

26. The recording medium defined in claim 25, wherein the program further includes the step of switching from the selected terminal to the other or another of the at least two terminals.

27. The recording medium defined in claim 25, wherein the network system further includes an interface interconnecting each of the at least two terminals and the network;
the program further including the step of obtaining information on the interface connected to the selected terminal from the interface when the selected terminal transmits the information on all the terminals to the controller.

28. The recording medium defined in claim 27, wherein the program further includes the step of changing the setting or settings of the terminal transmitting the information to the controller, or of the interface connected to the terminal.

29. The recording medium defined in claim 25, wherein each of the terminals is a printer or a scanner.

30. A network system according to claim 25 wherein the selected terminal judges whether or not each of the other terminals is made from a same maker as the selected terminal.

31. A network system according to claim 30 wherein if the one of the other terminals is made from the same maker as the selected terminal, the selected terminal obtains information on the one of the other terminals.

32. A network system according to claim 30 wherein a list of the information collected on the selected terminal is displayed on a display of the controller, and, when a terminal on the network is specified on the display, information on the specified terminal is displayed on the display.

* * * * *